Aug. 2, 1932.                J. S. TAYLOR                1,869,524
                              BATTERY POST
                           Filed Jan. 19, 1931
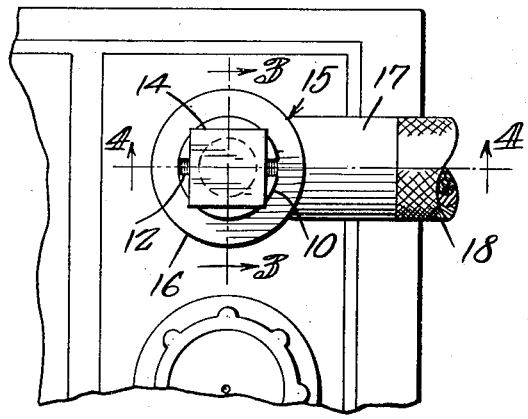
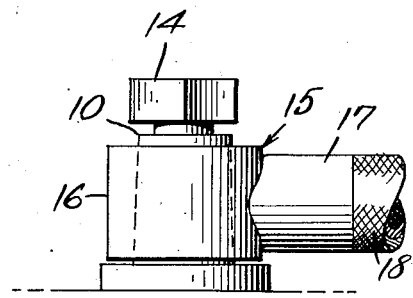
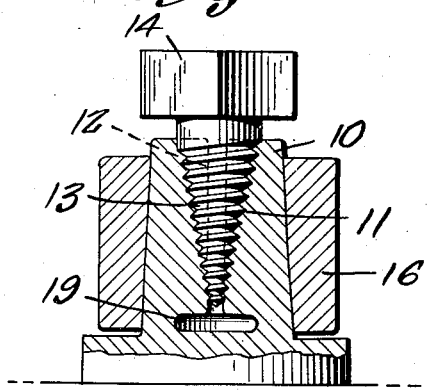
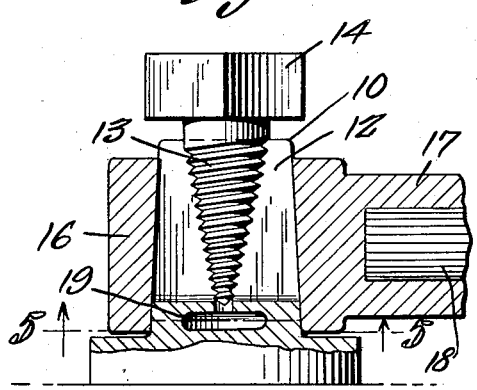
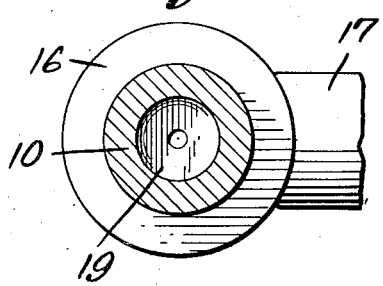
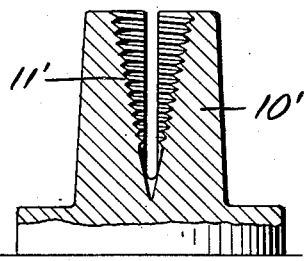
James S. Taylor,
            INVENTOR
BY Victor J. Evans
and A. L. Evans
            ATTORNEYS Patented Aug. 2, 1932

1,869,524

UNITED STATES PATENT OFFICE

JAMES S. TAYLOR, OF ALBUQUERQUE, NEW MEXICO, ASSIGNOR OF ONE-HALF TO EARL BEE YOUNG, OF ALBUQUERQUE, NEW MEXICO

BATTERY POST

Application filed January 19, 1931. Serial No. 509,784.

This invention relates to electric connectors especially adapted for storage batteries, an object being to provide means for easily and quickly attaching a cable terminal to a battery post to provide a tight connection, yet permit of easy and ready removal of the cable when desired.

Another object of the invention is the provision of a connector which is simple in construction, reliable and efficient in use, and may be manufactured and sold at a nominal cost.

With the above and other objects in view, the invention further includes the following novel features and details of construction, to be hereinafter more fully described, illustrated in the accompanying drawing and pointed out in the appended claims.

In the drawing:—

Figure 1 is a fragmentary plan view showing a portion of a storage battery with the invention applied.

Figure 2 is an elevation of the same.

Figures 3 and 4 are sectional views taken respectively on the lines 3—3 and 4—4 of Figure 1.

Figure 5 is a section on the line 5—5 of Figure 4.

Figure 6 is a sectional view showing a modified form of post.

Referring to the drawing in detail wherein like characters of reference denote corresponding parts, the reference character 10 indicates a battery post which is preferably made of lead or other soft metal. This post is tapered, and is provided with a threaded tapered opening 11, and is split longitudinally upon opposite sides of this opening as shown at 12.

The opening 11 is designed to receive a tapered screw 13 which is made of relatively hard material, such as brass. This screw is provided with a head 14 for the accommodation of a pair of pliers or a wrench. The reference character 15 indicates a cable which includes a ring 16 which is also preferably of brass, and a socketed member 17 which extends radially from the ring and to which is attached one end of the cable 18. The ring may be cheaply made by stamping it from brass and is designed to receive the post 10. By means of the screw 13, the post 10 may be expanded to tightly engage the inner periphery of the ring and provide a proper electrical connection.

To facilitate expansion of the post 10, the latter is provided at its lower end with a flat circular recess 19 which communicates with the lower end of the threaded bore 11, so that when the screw is inserted, the post 10 will be expanded substantially throughout its length.

By forming the post of lead and the screw of brass, the post may be molded with a smooth tapered socket and the thrust formed by means of the screw. Due to the difference in materials and the tapered formation of the screw and the socket 11, a partial rotation of the screw in one direction will release the screw throughout its entire length so that it may be readily removed.

In Figure 6 the post 10' is tapered as shown and is provided with a threaded tapered opening 11', the walls of which meet at the inner end of the opening, the recess 19 being omitted.

The invention is susceptible of various changes in its form, proportions and minor details of construction and the right is herein reserved to make such changes as properly fall within the scope of the appended claims.

Having described the invention what is claimed is:—

1. An electric cable connector for storage batteries comprising a tapered post split longitudinally and provided with a tapered threaded bore, a cable terminal having an opening to receive the post, and a tapered screw engageable within the threaded bore to expand the post and engage the walls of the terminal opening.

2. An electric cable connector for storage batteries comprising a tapered post split longitudinally and provided with a tapered threaded bore and a flat centrally located circular recess at the bottom of the post in communication with the bore, a cable terminal having an opening to receive the post, and a tapered screw engageable within the threaded bore to expand the post and engage the walls of the terminal opening.

3. An electric cable connector for storage batteries comprising a soft metal tapered post split longitudinally and provided with a tapered threaded bore, a cable connector formed of relatively hard metal and having an opening to receive the post, and a tapered screw of relatively hard metal engageable within the threaded bore to expand the post and engage the walls of the terminal opening.

In testimony whereof I affix my signature.

JAMES S. TAYLOR.